3,076,848
CATALYTIC PROCESS FOR PREPARING ORTHO-
ALKYL THIOPHENOLS
Robert J. Laufer, Pittsburgh, Pa., assignor to Consolidation Coal Company, Pittsburgh, Pa., a corporation of Pennsylvania
No Drawing. Filed Nov. 21, 1960, Ser. No. 70,404
18 Claims. (Cl. 260—609)

This invention relates to alkylated thiophenols and processes for preparing them. More particularly, it relates to a process whereby ortho-alkyl thiophenols are prepared by direct nuclear alkylation of a thiophenol in the presence of a catalyst selected from the group consisting of aluminum chloride, aluminum bromide, aluminum iodide, zirconium tetrachloride, titanium tetrachloride, dihydroxyfluoboric acid, hydrogen fluoride, and aqueous hydrogen fluoride-boron trifluoride complex.

The problems involved in the direct alkylation of thiophenols are well known. As has been pointed out in U.S. Patent 2,753,378:

"In contrast with phenolic compounds, which are simply alkylated to produce alkyl phenols, previous efforts to alkylate thiophenols have resulted in alkylation exclusively of the sulfur atom with the resulting production of aryl alkyl sulfides. Since efforts to effect carbon alkylation of thiophenols in the past have resulted in the production of aryl alkyl sulfides, it has been necessary to resort to means such as zinc dust reduction of alkyl benzene sulfonyl chlorides, the reaction of diazotized alkaryl amines with hydrogen sulfide, catalytic hydrogenation of aryl sulfonic acids and the action of sulfur on Grignard reagents in order to produce alkyl-substituted thiophenols. In addition to the tendency towards thioether formation, attempted alkylation of thiophenols has also been complicated by the fact that common alkylating catalysts such as anhydrous aluminum chloride and concentrated sulfuric acids have tended to cause desulfurization and condensed ring formation at relatively mild operating conditions."

It has been reported in the prior art that thiophenols, including ortho- and meta-substituted alkyl thiophenols, can be directly alkylated in the para position by using a combination of a specific alkylating agent, namely, either a tertiary aliphatic alcohol or a tertiary aliphatic mercaptan, together with a specific catalyst, namely, an aluminum halide catalyst, e.g., aluminum chloride. Primary and secondary alcohols are considered unsuitable as alkylating agents in that sulfur-alkylated products are reported to be produced exclusively.

Relatively little information is available in the chemical literature with respect to the preparation of ortho-substituted alkyl thiophenols. None of this information relates to the direct nuclear alkylation of thiophenols in the ortho position. Heretofore, to obtain o-alkyl thiophenols, other than o-thiocresol and possibly o-ethylthiophenol, relatively expensive and involved techniques were required, which made the processes of little or no commercial interest. In one such method, the corresponding o-alkyl aniline derivative is converted to the o-alkyl thiophenol by the relatively elaborate Leukart synthesis. In another method, the o-alkyl benzene sulfonyl chloride is converted to the o-alkyl thiophenol by a standard acid-metal reduction. The preparation of the starting materials for these reactions is further frequently involved and expensive.

Accordingly, it is an object of the present invention to provide a method, free from the disadvantages of known methods, for directly alkylating a thiophenol in the ortho position of the ring.

It is an additional object to provide novel ortho-alkylated thiophenols.

It is still a further object to provide orthosubstituted alkylated thiophenols in high yield by utilizing the process of this invention in conjunction with thioether cleavage techniques.

This invention involves the discovery that o-alkyl thiophenols may be produced in substantial yield by direct nuclear alkylation of thiophenol and its homologs with a selected olefin or olefin-acting alkylating agent in the presence of a specified catalyst under prescribed alkylating conditions. This invention provides means for producing ortho-substituted alkyl thiophenols by a direct nuclear alkylation process which is adaptable to commercial exploitation.

Under selected ring-alkylating conditions, t-alkyl-generating olefins, e.g., isobutylene can be made to nuclearly alkylate a thiophenol. However, the t-alkyl group will substitute in the para position only. If this position is blocked, ortho substitution will not take place; only sulfides, i.e., thioethers, will be formed.

In accordance with this invention, an alkylatable thiophenol containing an ortho position that is "free," i.e., unsubstituted by other than a hydrogen atom, is converted to an o-alkyl thiophenol in substantial yield by reacting it with a primary or secondary alkyl-generating olefin or olefin-acting alkylating agent under ring alkylating conditions in the presece of a catalyst selected from the class consisting of anhydrous aluminum chloride, aluminum bromide, aluminum iodide, zirconium tetrachloride, titanium tetrachloride, dihydroxyfluoboric acid, hydrogen fluoride, and aqueous hydrogen fluoride-boron trifluoride complex so that there occurs substantial substitution by the primary or secondary alkyl group in the ortho position. Further, in accordance with this invention, it is also possible to obtain nuclear dialkylation in the event that both ortho positions are unsubstituted. As used herein, the term "non-tertiary alkyl group" is inclusive of primary and secondary alkyl groups, e.g., ethyl, propyl, isopropyl, sec-butyl, and is exclusive of tertiary alkyl groups, e.g., tert-butyl, tert-amyl.

In addition to ortho-substituted mono and dialkyl thiophenols, S-alkyl thiophenols are also obtained. These sulfides or thioethers may be quantitatively converted to the corresponding thiophenols using a sulfide-cleavage technique. The product distribution obtained by the alkylation is determined by the selection of the thiophenol, the olefin-acting alkylating agent, the catalyst, and the specific reaction conditions. The use of low temperatures is particularly favored.

Suitable alkylating agents include non-branched olefins, e.g., ethylene, propylene, cyclopentene, and certain olefin-acting paraffins, e.g., cyclopropane. The propylation reaction generally gives highest yields, with higher olefins giving lower yields of ortho-substituted ring-alkylated products. In general, non-terminal linear olefins, e.g., 2-butene, give poorer results than their terminal isomers, e.g., 1-butene. It is noted that the by-product sulfides cannot be isomerized by further reaction in the presence of the alkylation catalyst. This isomerization technique may be effectively used for converting tertiary S-alkyl thiophenols to corresponding para-alkylated thiophenols. However, the sulfides formed in the present process may be quantitatively converted to the corresponding starting thiophenol or o-alkyl thiophenol by using any of various thioether cleavage techniques, e.g., reaction in the presence of either sodium metal in liquid ammonia, alumina-silica, or solid phosphoric acid. Effectively, then, in accordance with this invention, total conversion of a thiophenol to a nuclearly substituted ortho-alkylated product may be obtained by combining the process of this invention of direct nuclear alkylation in the ortho position with subsequent sulfide cleavage.

Specific sulfide cleavage processes are disclosed and claimed in the following copending application: M. D. Kulik and M. B. Neuworth, S.N. 94,164; R. J. Laufer, S.N. 94,163; and R. J. Laufer and M. B. Neuworth, S.N. 94,161; all filed March 8, 1961, and assigned to the assignee of the present application.

The terms "alkylation" or "alkylating" as used herein, unless otherwise indicated, are directed to the substitution of a primary or secondary alkyl hydrocarbon radical for a hydrogen atom in one or more ortho positions of a thiophenolic compound. The term "C-alkylation" is specific to substitution in the ring, and "S-alkylation" refers to substitution of the hydrogen atom attached to the sulfur atom to form an alkyl aryl sulfide, i.e., a thioether. The term "olefin" as used herein may embrace olefin-acting cycloparaffins which generate primary or secondary alkyl groups.

The alkylatable thiophenolic compounds that are employed as starting materials in the process of this invention contain a hydrogen atom in at least one ortho position. Alkyl substituents may be present on the remaining ring positions. Problems of steric hindrance, which ordinarily occur when an attempt is made to substitute a group onto the ring in a position adjacent to another group already on the ring, are of relatively minor importance compared with similar problems which occur under conditions of para alkylation. Thus, propylation of m-thiocresol yields significant amounts of both possible ortho mono-isopropyl derivatives as well as of the 2,6-diisopropyl derivative, whereas t-butylation of m-thiocresol is not feasible using isobutylene.

Thiophenol homologs that may be advantageously employed in the process of this invention include, for example, o-thiocresol, m-thiocresol, p-thiocresol, m-ethylthiophenol, 2,3-, 2,4-, 2,5-, 3,4-, and 3,5-thioxylenols, 4-t-butyl-thiophenol and 4-t-butyl-o-thiocresol. In general, thiophenol itself and thiophenol substituted only by lower alkyl radicals ($C_1$ to $C_5$) are preferred as alkylatable starting materials. These preferred alkylatable thiophenols are unsubstituted by other than hydrogen in either or both ortho positions on the ring.

In general, primary or secondary alkyl-generating unsaturated aliphatic hydrocarbons having from 2 to 12 carbon atoms, e.g., various olefins and olefin polymers, are suitable and preferred for the practice of this invention. Particularly useful are $C_2$ to $C_5$ olefins, cyclic olefins, and olefin-acting cycloparaffins. As the molecular weight of the olefin employed increases, yields of ortho-substituted ring-alkylated product decrease. Suitable alkylating agents that may be used for obtaining substitution in the ortho position of the ring include ethylene, propylene, cyclopropane, 1-butene, 2-butene, 1-pentene, and cyclopentene. Ethylene and cyclopropane yield primary alkyl groups; the other olefins used for effecting ortho substitution yield secondary alkyl groups. This invention finds its preferred utility in the substitution of these secondary alkyl groups in the ortho position of the ring.

It is considered an essential feature of this invention that a catalyst selected from the group consisting of anhydrous aluminum chloride, aluminum bromide, aluminum iodide, zirconium tetrachloride, titanium tetrachloride, dihydroxyfluoboric acid, hydrogen fluoride, and aqueous hydrogen fluoride-boron trifluoride complex be used together with the primary or secondary alkyl-generating olefin or olefin-acting alkylating agent to effect the direct nuclear alkylation of the thiophenol in the ortho position. Aluminum chloride is particularly preferred as alkylation catalyst because of its ready availability and high activity at relatively low concentrations by weight. Because of their higher molecular weights, greater concentrations by weight of aluminum bromide, aluminum iodide, and zirconium tetrachloride are required to obtain the same molar concentration of catalyst as for aluminum chloride.

Only certain specific catalysts may be used in the practice of this invention. For obtaining ortho substitution of a primary or secondary alkyl group into the ring of a thiophenol, so-called conventional alkylation catalysts are not substitutive for each other. Thus, catalysts which are effective in a Friedel-Crafts reaction with respect to ring-alkylating phenols, e.g., zinc chloride, antimony trichloride, sulfuric acid, phosphoric acid, and ferric chloride, are essentially ineffective for the ring alkylation of thiophenols in the ortho or para position. Generally, those catalysts which are effective for the para alkylation of thiophenols, using t-alkyl-generating olefins, are also effective for the ortho alkylation of thiophenols, using primary and secondary alkyl-generating olefins. However, titanium tetrachloride, which is considered ineffective as a catalyst for the para alkylation of thiophenols, is surprisingly highly effective as a catalyst for the ortho alkylation of thiophenols. Furthermore, zirconium tetrachloride and titanium tetrachloride unexpectedly favor the formation of alkyl 2,6-dialkaryl sulfides. Cleavage of the sec-alkyl substituted sulfides affords at present the only practical synthesis known for preparing 2,6-di(sec-alkyl)-thiophenols.

The choice of catalyst and selection of reaction conditions significantly affect the selectivity of the alkylation reaction. Thus, all the catalysts of this invention, with one exception, when primary or secondary alkyl-generating olefins are used as alkylating agents, yield ring-alkylated products which are alkylated in the ortho position almost exclusively. However, when dihydroxyfluoboric acid is used as catalyst, together with these alkylating agents, a minor but substantial amount of alkylation in the para position of the ring by the primary or secondary alkyl group also occurs in addition to predominating ortho alkylation. This phenomenon appears uniquely associated with the use of this particular catalyst.

Temperatures between about −50° and +50° C. may be successfully employed in the practice of this invention. The use of temperatures below 25° C. is preferred to minimize sulfide formation. Where reaction rate considerations permit, temperatures between −25 and −50° C. are particularly effective for obtaining maximum nuclear alkylation. At temperatures between 75 and 100° C., which are considered optimal for para alkylation, little or no ortho alkylation is obtained, thiol degradation being the principal reaction. An amount of 5 to 20 percent of catalyst, based on the original weight of the thiophenol, is generally preferred for obtaining optimum yields. However, amounts of catalysts between 3 and 100 percent by weight are considered suitable depending upon specific reaction conditions.

Because of the relatively rapid rate of the ortho alkylation reaction and the low temperatures at which it is preferably carried out, it has been found that degradation of the thiophenol in the presence of the catalyst is readily avoidable. No special anti-degradation techniques are required. This is in marked contrast to the special techniques that must be used with, e.g., aluminum chloride as a catalyst for para alkylation.

The process disclosed herein is particularly advantageous for commercial exploitation inasmuch as the alkylated thiophenol may be completely converted to the ortho-C-alkylate product with no S-alkylate product present. The S-alkylate product formed generally consists of the n-alkyl or sec-alkyl aryl sulfide and also of the alkyl o-alkaryl sulfide. The formation of the latter sulfide is favored when a molar excess of alkylating agent is used. Where both ortho positions are initially free, other sulfides will also be formed. In contrast to the isomerization of sulfide, which is effectively used in the para alkylation reaction, in the present process the by-product sulfides are cleaved to form their corresponding thiophenols. This cleavage may be accomplished by reaction of the sulfide with sodium in liquid ammonia, or by heating over alumina-silica catalyst or over solid phosphoric acid, e.g., phosphorus pentoxide absorbed on an inert carrier such as kieselguhr, commercially available as UOP No. 2 catalyst.

In general, in the direct alkylation step, if less than a mole of alkylating agent per mole of alkylatable thiophenol is used, assuming one open ortho position, increased formation of the ortho-substituted product is favored. A molar ratio of 0.75 to 1 of alkylating agent to thiophenol is preferred for this purpose, a ratio of 0.80 being considered optimal. With two open ortho positions, an increase in the quantity of alkylating agent used is preferred. However, because of the complexity of the reactions involved, other factors may predominate in determining product distribution. Thus the amount of olefin that the reaction system will absorb is usually predetermined by other reaction conditions, particularly temperature.

Without being restricted by the reaction mechanism to be suggested, it is believed that the high ortho selectivity of the reaction, combined with the promoting effect of low reaction temperatures, suggests the involvement of the olefin and the thiophenol in an intermediate complex in the vicinity of the sulfur atom. The effect of low temperatures is apparently to increase the stability of the complex. In contrast to para alkylation, it is believed that little or no nuclear alkylation or migration of the sulfides occurs. Thus recycling of the sulfides in the presence of catalyst is ineffective for increasing the yield of the ortho-alkylated thiophenol because of the absence of isomerization phenomena. It is believed that once all the olefin has been absorbed by the system, the reaction is essentially complete. An increase in reaction time beyond this point should not therefore significantly affect the final product distribution.

Depending upon specific reaction conditions with respect to alkylatable thiophenol, alkylating agent, catalyst, and temperature, a reaction time of as little as half an hour may be employed. In general, reaction times between 2 and 3 hours are preferred. Under optimum olefin to thiophenol ratio, the reaction is rapidly completed. An increase in the reaction time beyond three hours will then give but little increase in the yield of o-alkyl thiophenol. Apparently, the final product distribution is rapidly attained, even at low temperatures.

The alkylated thiophenols, both C-alkylated and S-alkylated, find a variety of uses. They are particularly useful as substantially odorless rubber peptizers. Several of these compounds or their metallic salts are of interest as lubricating oil additives because of their antioxidant and detergent properties. As antioxidants, they serve to prevent resin formation in fuels; condensed to form thioacetals, they are particularly suited as additives for high pressure lubricating oils; they are also useful as additives for metal cleaners to protect the metal from atmospheric attack; they also protect drying oils, such as linseed oil, from darkening and oxidation; they have also been used to stabilize preparations of adrenalin and other hormones. Various of the S-alkylate compounds are seen as possessing useful insecticidal properties in addition to being useful as ready sources for the production of the corresponding thiophenols.

For purposes of illustration, without limiting its scope, the process of this invention will be particularly described with reference to the conversion of thiophenol to o-isopropyl thiophenol. The following reactions, shown schematically and not stoichiometrically, illustrate the manner in which conversion of thiophenol to o-isopropyl-thiophenol may be obtained under preferred reaction conditions.

Reaction 1.—Propylation of thiophenol

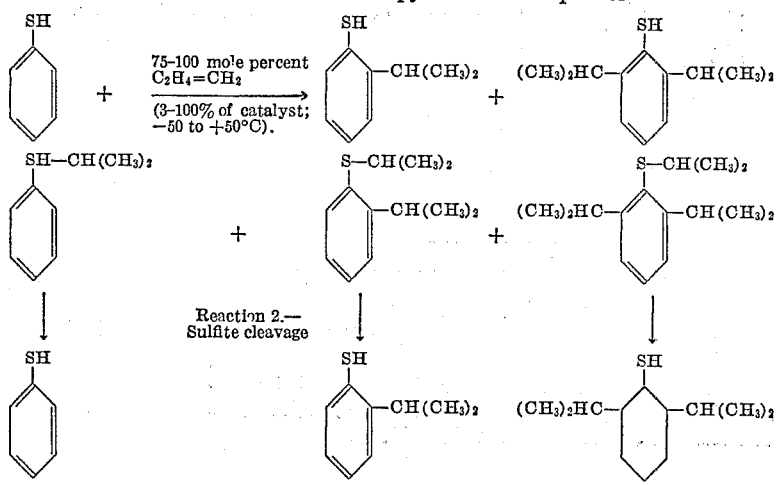

It is noted that in accordance with the above two reactions, the final product obtained is either a mono- or di-ortho-alkylated product, or convertible thereto.

EXAMPLE 1

*Reaction of Propylene with Thiophenol ($AlCl_3$, $AlBr_3$, $AlI_3$, $ZrCl_4$, and $TiCl_4$ as catalysts)*

For the 14 runs reported in Table I, a three-necked flask fitted with a mechanical stirrer and a Dry Ice condenser was used. The flask was immersed in a Dry Ice-acetone bath. The thiophenol and catalyst were charged at room temperature. Each of the above five catalysts is soluble in the thiophenol. The resulting solution was then cooled to the desired reaction temperature. The minimum temperature available was determined by freezing of the reaction mixture in the absence of added solvent. Propylene was then added via the Dry Ice condenser from a weighed cylinder. The rate of addition was regulated in order to control the temperature of the reaction. The reaction appears to be unusually exothermic during the initial stages of propylene addition. Under most conditions, absorption of propylene was very rapid, and the reaction appeared to be complete within ten to fifteen minutes after total addition of the propylene.

TABLE I.—PROPYLATION OF THIOPHENOL (AlCl₃, AlBr₃, AlI₃, ZrCl₄, TiCl₄)

Conditions for runs 1–14:
Thiophenol charged: 550 (5 moles) [1]
Propylene charged: 168 grams (4 moles) [2]
Molar ratio propylene to thiophenol: 0.8 (See footnotes 1 and 2)

Catalysts:
Anhydrous AlCl₃: Runs 1–4, 0.25 mole (33 grams, 6% by weight of thiophenol); runs 5–8, 0.75 mole (100 grams, 18% by weight of thiophenol)
Anhydrous AlBr₃ (run 9): 0.35 mole (93 grams, 17% by weight of thiophenol)
Anhydrous AlI₃ (run 10): 0.26 mole (106 grams, 39% by weight of 275 grams thiophenol)
Anhydrous ZrCl₄: Run 11, 0.23 mole (75 grams, 13.5% by weight of thiophenol); run 12, 0.43 mole (100 grams, 18% by weight of thiophenol); run 13, 0.14 mole (33 grams, 6% by weight of thiophenol)
Anhydrous TiCl₄ (run 14): 0.53 mole (100 grams, 18% by weight of thiophenol)

| Run No. | Catalyst | Propylene addition | | Thiophenol converted, percent by weight | Product yield, mole percent based on converted thiophenol | | | | |
|---|---|---|---|---|---|---|---|---|---|
| | | Temp., °C. | Time, hours | | o-Isopropyl-thiophenol | 2,6-diisopropyl thiophenol | Isopropyl phenyl sulfide | Isopropyl o-propyl-phenyl sulfide | Isopropyl 2,6 diisopropylphenyl sulfide |
| 1 | AlCl₃ | 100 | 6 | 96 | 1 | Trace | 10 | 3 | [4] 0.6 |
| 2 | AlCl₃ | 56–70 | 4.5 | 49 | 21 | 0.6 | 21 | 11 | [5] 5 |
| 3 | AlCl₃ | 20–102 | [3] 2.5 | 61 | 34 | 2.7 | 37 | 13 | 5 |
| 4 | AlCl₃ | 16–25 | 5 | 44 | 34 | 2.8 | 16 | 12 | [6] 13 |
| 5 | AlCl₃ | 10–34 | 1 | 55 | 30 | 2.7 | 20 | 13 | [7] 10 |
| 6 | AlCl₃ | −17 to −10 | 2.8 | 55 | 34 | 6.6 | 17 | 12 | 7 |
| 7 | AlCl₃ | −17 to −11 | 0.5 | 42 | 44 | 7 | 25 | 6 | 0.7 |
| 8 | AlCl₃ | −70 to −44 | 1 | 56 | 43 | 17 | 15 | 7 | 2 |
| 9 | AlBr₃ | −37 to +33 | 4.8 | 38 | 41 | 3.6 | 20 | 12 | 9 |
| 10 | AlI₃ | −20 to −23 | 5 | 43 | 43 | 3 | 28 | 12 | 3 |
| 11 | ZrCl₄ | 25–38 | 1 | 48 | 27 | 1.4 | 9 | 9 | 23 |
| 12 | ZrCl₄ | −18 to −13 | 1.3 | 46 | 30 | 3.6 | 8 | 5 | 34 |
| 13 | ZrCl₄ | 0–24 | 5.5 | 30 | 35 | 1.4 | 6 | 9 | 22 |
| 14 | TiCl₄ | 3–16 | 0.9 | 45 | 33 | 2.8 | 4 | 3 | 31 |

[1] For Run 8, 470 ml. of CS₂ was added as solvent. For Run 10, 275 grams (2.5 moles) was charged.
[2] Not all absorbed in Runs 1, 2, 4, and 13. Run 7: 105 grams (2.5) moles charged; Runs 11 and 14: 210 grams (5 moles) charged. For Run 9, 114 grams (2.7 moles) and for Run 10, 80 grams (1.9 moles) were maximum absorbed by system.
[3] Most was absorbed at 20–60° C. in 5 minutes.
[4] Major isolated product was diphenyl sulfide (32%) because of high reaction temperature used.
[5] Also 4% diphenyl sulfide.
[6] Also 0.9% diphenyl sulfide.
[7] Also 1.6% diphenyl sulfide.

EXAMPLE 2

Reaction of Propylene With Substituted Thiophenols (AlCl₃ Catalyst)

Propylation was conducted under essentially the same conditions as reported for Example 1, in the presence of AlCl₃ as catalyst, the alkylatable thiophenols being 4-t-butylthiophenol, m-thiocresol, and mixed thiocresols. The results obtained are shown in Table II.

EXAMPLE 3

Reaction of Thiophenol With Various Alkylating Agents

Thiophenol was reacted with different primary and secondary alkyl-generating olefin and olefin-acting alkylating agents in the presence of AlCl₃ or ZrCl₄ as catalyst. The results obtained are shown in Table III.

TABLE II

Conditions for runs 15–17:
Run 15: 830 g. (5 moles) p-t-butylthiophenol to 168 g. (4 moles) propylene
Run 16: 124 g. (1 mole) m-thiocresol (plus 150 ml. of CS₂ as solvent) to 42 g. (1 mole) propylene.
Run 17: 622 g. (5 moles) thiocresols [1] to 26 g. (3 moles) propylene.

Catalyst—Anhydrous AlCl₃:
Run 15: 0.75 mole (100 grams, 12% by weight)
Run 16: 0.15 mole (20 grams, 16% by weight)
Run 17: 0.47 mole (63 grams, 10% by weight)

| Run No. | Propylene addition | | Thiol converted, percent by weight | Product yield, mole percent based on converted thiol | | | | |
|---|---|---|---|---|---|---|---|---|
| | Temp., °C. | Time, hours | | o-Isopropyl thiol | 2,6-diisopropyl thiol | Isopropyl aryl sulfide | Isopropyl o-isopropyl-aryl sulfide | Isopropyl 2,6-diisopropylaryl sulfide |
| 15 | −18 to −9 | 1 | 56 | 43 | | 12 | 18 | 9 |
| 16 | −51 to −39 | | 68 | [3] 38 | 29 | 9 | [4] 5 | 1 |
| 17 | 21 to 30 | 0.5 | [2] 47 | [5] 35 | Nil | [5] 14 | ([6]) | ([6]) |

[1] 38% ortho, 47% meta, and 15% para.
[2] Conversion of total thiocresols. Conversions of individual isomers were: ortho, 31%; meta, 57%; para, 53%.
[3] Two possible isomers in 27 and 11% yields.
[4] Two possible isomers in 3.2 and 1.8% yields.
[5] Mixed isomers.
[6] Not determinable.

TABLE III

Conditions for runs 18-28:
Molar ratio of olefin to thiophenol: 0.8 for runs 18-27; 0.6 for run 28.
Catalysts: Anhydrous AlCl₃ for runs 18, 20-23, 25-28. Anhydrous ZrCl₄ for runs 19 and 24.

| Run No. | Olefin | Catalyst concen., percent by weight thiol | Olefin addition Temp., °C. | Olefin addition Time, hours | Thiophenol converted, percent by weight | Product yield, mole percent based on converted thiophenol | | | | |
|---|---|---|---|---|---|---|---|---|---|---|
| | | | | | | o-Alkyl thiophenol | 2,6-dialkyl thiophenol | Alkyl phenyl sulfide | Alkyl o-alkaryl sulfide | Alkyl 2,6-dialkaryl sulfide |
| 18 | Cyclopropane | 18 | 15-39 | 1.3 | 38 | ¹6 | | 56 | 1 | |
| 19 | ...do... | 17 | -21 to -15 | 4 | 16 | 9 | (²) | 60 | (²) | (²) |
| 20 | 1-butene | 6 | 25-55 | 0.1 | 68 | 17 | (²) | 59 | 10 | (²) |
| 21 | ...do... | 10 | 11-26 | 2.5 | 47 | 16 | | 36 | 15 | 5 |
| 22 | ...do... | 18 | -24 to -10 | 1 | 50 | 22 | 0.8 | 26 | 21 | 11 |
| 23 | 2-butene ³ | 10 | 12-28 | 2.3 | 38 | 10 | | 62 | 6 | |
| 24 | 1-butene | 18 | -17 to -10 | 1.2 | 37 | 17 | Nil | 18 | 15 | 20 |
| 25 | 1-pentene | 18 | -15 to -10 | 1.1 | 51 | 24 | | 29 | ⁴22 | ⁵10 |
| 26 | Cyclopentene | 18 | -15 to -10 | 0.6 | 46 | 16 | Nil | 32 | ⁶21 | ⁷9 |
| 27 | Cyclohexene | 18 | -18 to -14 | 1 | 40 | ⁸4 | Nil | 67 | 3.5 | |
| 28 | Ethylene | 18 | 20-32 | 3.5 | 36 | ⁹25 | <1 | 31 | ¹⁰14 | |

¹ Also less than 2% o-isopropyl thiophenol.
² Not determinable.
³ Commercial cis-trans mixture.
⁴ Boiling point: 156° C. at 10 mm. Hg. Refractive index (25°/D): 1.5190.
⁵ Boiling point: 179-182° C. at 10 mm. Hg. Refractive index (25°/D): 1.5100.
⁶ Boiling point: 193° C. at 10 mm. Hg. Refractive index (25°/D): 1.5738.
⁷ Boiling point: 162-167° C. at 0.3 mm. Hg. Refractive index (25°/D): 1.5718.
⁸ Also 1.5% of a material believed to be p-(1-methylcyclopentyl) thiophenol.
⁹ Identity established by alternate synthesis.
¹⁰ Based on infrared spectrum.

EXAMPLE 4

*Reaction of Thiophenol in the Presence of Aqueous Hydrogen Fluoride-Boron Trifluoride Complex*

A series of runs was performed in the presence of a catalyst consisting of $BF_3$—$H_2O$—HF complex, derived from aqueous hydrofluoric acid and boron trifluoride. This catalyst was prepared in accordance with the procedure set forth by W. N. Axe and W. A. Schulze, Ind. Eng. Chem., 39, 1273 (1947). Of the series of catalysts used in practicing the process of the present invention, only this catalyst complex is recoverable as an immiscible liquid phase, and may be reused after resaturation with boron trifluoride. The necessary concentration of boron trifluoride is maintained in the reaction mixture under superatmospheric pressure. This complex is particularly convenient to handle, and because of its forming an immiscible phase may be readily recycled. With continued reuse the catalyst appears to absorb olefin and lose activity. The results obtained are shown in Table IV.

EXAMPLE 5

*Reaction of Thiophenol With 1-Butene, Using $BF_3$—$H_2O$—HF Catalyst*

Equimolar amounts of thiophenol and 1-butene were reacted in the presence of 15 percent by weight of $BF_3$—$H_2O$—HF complex (based on thiophenol). The reaction was conducted at a temperature between —3 and +3° C. for 0.7 hour. Forty-five percent of the thiophenol was converted. Of the converted material, 20 percent was recovered as o-sec-butylthiophenol, 21 percent as sec-butyl phenyl sulfide, 18 percent as sec-butyl o-sec-butylphenyl sulfide, and 3 percent as sec-butyl 2,6-di-sec-butylphenyl sulfide.

EXAMPLE 6

*Reaction of Thiophenol With Propylene in Presence of Dihydroxyfluoboric Acid*

The catalyst was prepared in accordance with the procedure of S. J. Sowa et al., J. Am. Chem. Soc. 57, 454 (1935). Five moles of thiophenol (550 grams) was reacted with 3.3 moles (139 grams) of propylene. The weight of catalyst was 11.5 percent by weight of thiophenol. The reaction was conducted at a temperature between 46 and 110° C. for 3.8 hours. Forty-seven percent of the thiophenol was converted. Of the converted material, 13 percent was o-isopropylthiophenol, 58 percent isopropyl phenyl sulfide, 2.5 percent isopropyl o-isopropylphenyl sulfide, and also an estimated 7 percent as p-isopropylthiophenol. This catalyst is unique among all the catalysts used in the practice of this invention in that in its presence a certain proportion of para-alklylated product having a primary or secondary alkyl substituent is obtained. All the other catalysts used are substantially exclusively ortho-directing with respect to primary and secondary alkyl substituents.

TABLE IV.—THIOPHENOL O-ALKYLATIONS CATALYZED BY $BF_3$—$H_2O$—HF

Conditions for runs 29-34: Thiophenol charged: 550 grams (5 moles)

| Run No | Propylene addition, gram moles | Reaction conditions Temp., °C. | Reaction conditions Time, hours | Catalyst, weight in grams | Thiophenol converted, percent by weight | Product yield, mole percent based on converted thiophenol | | | | |
|---|---|---|---|---|---|---|---|---|---|---|
| | | | | | | o-Isopropylthiophenol | 2,6-diisopropyl-thiophenol | Isopropyl phenyl sulfide | Isopropyl o-isopropylphenyl sulfide | Isopropyl 2,6-diisopropyl-phenyl sulfide |
| 29 | 5 | 2-5 | 1 | 79 | 59 | 43 | 2.7 | 7 | 15 | 14 |
| 30 | ¹3.5 | 0-4 | 0.75 | ²137 | 48 | 40 | 2 | 9 | 12 | 13 |
| 31 | ¹3.2 | 0-6 | 0.75 | ²210 | 40 | 36 | 1.4 | 10 | 13 | 14 |
| 32 | 11.7 | | | 79 plus 28 g. $BF_3$ | 49 | 40 | 2.1 | 8 | 13 | 14 |
| 33 | ¹3.3 | 0-10 | 0.7 | 40 | 41 | 43 | 1.5 | 11 | 15 | 11 |
| 34 | ¹3 | 18-36 | 0.8 | 40 | 39 | 36 | 1.1 | 20 | 16 | 5 |

¹ Maximum propylene absorbed.
² Recovered catalyst from previous cycle and resaturated with $BF_3$.

EXAMPLE 7

*Reaction of Thiophenol With Propylene in the Presence of Hydrogen Fluoride*

A polyethylene reactor was charged with 150 milliliters of anhydrous hydrogen fluoride at 6° C. Then 55 grams of thiophenol (99+% pure) was added. The thiophenol formed a separate (lower) layer. Then 22 grams of propylene was added to the system beneath the liquid surface, using magnetic stirring, over a period of 25 minutes. The temperature rose rapidly to 14° (6 minutes) and remained at 16–17° for the remainder of the addition. During the reaction an ice bath was used for cooling purposes to maintain a low temperature.

Following reaction, hydrogen fluoride was distilled from the reactor to a final temperature of 40° C. The residue remaining within the reactor weighed 77.5 g. To this residue was added 200 milliliters of water to extract any residual hydrogen fluoride remaining. The aqueous-insoluble organic matter in the residue was then taken up in ether. After washing, the ethereal phase was extracted with aqueous caustic. It was then acidified with HCl to free the alkylated thiophenols. The latter were then taken up in ether, washed free of acid, and dried. The caustic-insoluble fraction was similarly washed and dried.

Conversion and Yield

Seventy-one percent of the thiophenol was converted. Of the converted material, 20 percent was o-isopropylthiophenol, 0.7 percent 2,6-diisopropylthiophenol, 32 percent isopropyl phenyl sulfide, 6 percent isopropyl o-isopropylphenyl sulfide, and 3 percent isopropyl 2-6-diisopropylphenyl sulfide.

This catalyst, because of its liquid state and low formula weight, may be used in relatively high concentrations in the reaction system, thereby permitting greater conversion of the treated thiophenol. Consequently, 100 percent conversion of the initial thiophenol may be obtained. With other catalyst systems, because of catalyst concentration problems, conversion of the thiophenol may be limited. It should be noted, as illustrated, that the catalyst is also readily recoverable from the reaction system by distillation, and hence available for reuse.

EXAMPLE 8

Cleavage of Sec-Alkyl Aryl Sulfide (Thioether Cleavage)

(a) *Reduction of isopropyl o-isopropylphenyl sulfide using sodium metal in anhydrous ammonia.*—Isopropyl o-isopropylphenyl sulfide (60.5 g.) was dissolved in 250 milliliters of ammonia maintained at its atmospheric reflux temperature, −33° C. Sodium metal was added in small pieces until an excess was present as determined by a blue coloration of the solution. The addition of sodium occurred over 1½ hours, with reaction of a half hour following the addition. After destruction of excess sodium and evaporation of ammonia, a residual solid was recovered and dissolved in 100 ml. of water. The aqueous solution was washed with ether, acidified, and the product extracted with ether. From the ethereal solution was recovered 38.8 g. o-isopropylthiophenol.

(b) *Reduction of isopropyl 2,6-diisopropylphenyl sulfide using sodium metal in anhydrous ammonia.*—Isopropyl 2,6-diisopropylphenyl sulfide (48 g.) was reacted with sodium metal in anhydrous ammonia as described above. Thirty grams of 2,6-diisopropylthiophenol was finally recovered. This represented complete conversion of the starting sulfide and recovery and product of the yield of 75 percent.

(c) *Cleavage of isopropyl o-isopropylphenyl sulfide using solid phosphoric acid catalyst.*—Isopropyl o-isopropylphenyl sulfide (150 g.) was heated at a temperature between 295 and 325° C. in the presence of 20 g. solid phosphoric acid catalyst and a high boiling paraffin oil. The paraffin oil serves to increase the temperature at which the sulfide may be refluxed, at atmospheric pressure. After reaction for five hours under controlled reflux conditions in a packed column, followed by final removal of pot and column holdup under reduced pressure, a distillate was recovered. This distillate was refractionated to yield the following products:

| | Weight, grams | Yield, mole percent (based on 78.5% conversion of sulfide) |
|---|---|---|
| Thiophenol | 7.7 | 11.5 |
| Isopropylphenyl sulfide | 6.0 | 6.5 |
| o-Isopropylthiophenol | 63.1 | 67 |
| p-Isopropylthiophenol | 6.0 | 6.2 |

(d) *Cleavage of isopropyl 2,6-diisopropylphenyl sulfide using solid phosphoric acid as catalyst.*—Isopropyl 2,6-diisopropylphenyl sulfide (139 g.) was heated in the presence of 20 grams of solid phosphoric acid and 140 grams of high boiling paraffin oil essentially as described above. The following products were recovered:

| | Weight (grams) | Yield, mole percent (based on 79% conversion of initial sulfide) |
|---|---|---|
| Thiophenol | 1.8 | 3.5 |
| Isopropylphenyl sulfide | 0.3 | 0.4 |
| o-Isopropylthiophenol | 9.5 | 13.4 |
| p-Isopropylthiophenol | 2.1 | 3.0 |
| Isopropyl isopropylphenyl sulfide | 6.6 | 7.3 |
| Diisopropylthiophenol [1] | 50.1 | 55.5 |

[1] Major isomer present was 2,6-diisopropylthiophenol.

Obviously many modifications and variations of the invention, as hereinbefore set forth, may be made without departing from the spirit and scope thereof, which are primarily directed to the direct alkylation of an alkylatable thiophenol in the ortho position in the presence of a specific catalyst using a primary or secondary alkyl-generating olefin as alkylating agent. The examples given, therefore, should be considered only illustrative of the invention, its scope being determined in accordance with the objects thereof and the appended claims.

I claim:

1. The process of substituting the hydrogen atom in an ortho position of a thiophenol by a non-tertiary alkyl group which comprises alkylating an alkylatable thiophenol containing a hydrogen atom in an ortho position with a monoolefinic hydrocarbon alkylating agent, in which the alkyl substituent formed is a non-tertiary alkyl group, under ring alkylating conditions in the presence of a catalyst selected from the class consisting of aluminum chloride, aluminum bromide, aluminum iodide, zirconium tetrachloride, titanium tetrachloride, dihydroxyfluoboric acid, hydrogen fluoride, and aqueous hydrogen fluoride-boron trifluoride complex so that there occurs substantial substitution by the non-tertiary alkyl group in an ortho position in addition to S-alkylation.

2. The process for preparing alkyl thiophenols substituted in an ortho position of the ring which comprises alkylating an alkylatable thiophenol containing a hydrogen atom in an ortho position with a monoolefinic hydrocarbon containing from 2 to 12 carbon atoms, and in which the alkyl substituent formed is a non-tertiary alkyl group, under ring alkylating conditions in the presence of a catalyst selected from the class consisting of aluminum chloride, aluminum bromide, aluminum iodide, zirconium tetrachloride, titanium tetrachloride, dihydroxyfluoboric acid, hydrogen fluoride, and aqueous hydrogen fluoride-boron trifluoride complex so that there occurs substantial substitution by the non-tertiary alkyl group in an ortho position.

3. The process for preparing alkyl thiophenols alkylated in an ortho position which comprises alkylating a thiophenol selected from the class consisting of thiophenol and lower alkyl-substituted thiophenols having an unsubstituted ortho position on the ring with a monoolefinic hydrocarbon containing from 2 to 12 carbon atoms, and in which the alkyl substituent formed is a non-tertiary alkyl group, under ring alkylating conditions in the presence of a catalyst selected from the class consisting of aluminum chloride, aluminum bromide, aluminum iodide, zirconium tetrachloride, titanium tetrachloride, dihydroxyfluoboric acid, hydrogen fluoride, and aqueous hydrogen fluoride-boron trifluoride complex so that there occurs substantial substitution by the non-tertiary alkyl group in an ortho position.

4. The process according to claim 3 wherein said catalyst is aluminum chloride.

5. The process for preparing o-isopropyl thiophenols which comprises reacting a thiophenol containing a hydrogen atom in an ortho position with propylene in the presence of a catalyst selected from the class consisting of aluminum chloride, aluminum bromide, aluminum iodide, zirconium tetrachloride, titanium tetrachloride, dihydroxyfluoboric acid, hydrogen fluoride, and aqueous hydrogen fluoride-boron trifluoride complex whereby substantial carbon propylation in an ortho position occurs.

6. The process according to claim 5 wherein said catalyst is aluminum chloride.

7. The process for preparing o-isopropylthiophenol which comprises reacting thiophenol with propylene in the presence of aluminum chloride as catalyst, whereby substantial carbon propylation in an ortho position occurs.

8. The process for preparing an ortho-alkylated thiophenol in substantial yield by direct nuclear alkylation of an alkylatable thiophenol which comprises admixing one part by weight of an alkylatable thiophenol selected from the class consisting of thiophenol and lower alkyl-substituted thiophenols having an unsubstituted ortho position, from 0.75 to 1 part by weight of a monoolefinic hydrocarbon containing from 2 to 12 carbon atoms and in which the alkyl substituent formed is a non-tertiary alkyl group, and from 3 to 25 percent by weight, based on the thiophenol, of a catalyst selected from the class consisting of aluminum chloride, aluminum bromide, aluminum iodide, zirconium tetrachloride, titanium tetrachloride, dihydroxyfluoboric acid, hydrogen fluoride, and aqueous hydrogen fluoride-boron trifluoride complex, maintaining the admixture at a temperature within the range of —50 to +50° C. for one-half to three hours so that there occurs substantial substitution by the nontertiary alkyl group in an ortho position of said thiophenol, and recovering the ortho-alkylated thiophenol from the mixture in substantial yield based on said thiophenol.

9. The process for preparing an ortho-alkylated thiophenol in substantial yield by direct nuclear alkylation of an alkylatable thiophenol which comprises admixing one part by weight of a thiophenol selected from the class consisting of thiophenol and thiocresols containing between 10 and 100 percent by weight of m-thiocresol, from 0.75 to 1 part by weight of a monoolefinic hydrocarbon containing from 2 to 12 carbon atoms and in which the alkyl substituent formed is a non-tertiary alkyl group, and from 5 to 10 percent by weight of aluminum chloride based on the weight of said thiophenol, maintaining the admixture at a temperature between —50 and +50° C. for one-half to three hours so that there occurs substantial substitution by the non-tertiary alkyl group in an ortho position of said thiophenol, and recovering the ortho-alkylated thiophenol from the mixture in substantial yield based on said thiophenol.

10. The process of substituting the hydrogen atom in an ortho position of a thiophenol by a non-tertiary alkyl group and obtaining substantially all ortho-C-alkylate product which comprises reacting an alkylatable thiophenol containing a hydrogen atom in an ortho position with a monoolefinic hydrocarbon containing from 2 to 12 carbon atoms and in which the alkyl substituent formed is a non-tertiary alkyl group, effecting said reaction in the presence of a catalyst selected from the class consisting of aluminum chloride, aluminum bromide, aluminum iodide, zirconium tetrachloride, titanium tetrachloride, dihydroxyfluoboric acid, hydrogen fluoride, and aqueous hydrogen fluoride-boron trifluoride complex so that the reaction products obtained includes substantial amounts of ortho-C-alkylate product in addition to S-alkylate products, and cleaving the S-alkylate products in the presence of a sulfide-cleaving catalyst to form additional ortho-C-alkylate product and starting thiophenol.

11. The process according to claim 10 wherein the regenerated starting thiophenol is recirculated in the system.

12. The process according to claim 10 wherein said catalyst consists of anhydrous hydrogen fluoride and is recoverable from the reaction system by distillation.

13. The process for preparing 2,6-di-alkylthiophenols which comprises reacting a thiophenol containing hydrogen atoms in both ortho positions with a monoolefinic hydrocarbon containing from 2 to 12 carbon atoms and in which the alkyl substituent formed is a non-tertiary alkyl group, effecting said reaction in the presence of a catalyst selected from the class consisting of zirconium tetrachloride and titanium tetrachloride so that the reaction product obtained includes substantial amounts of ortho-C-alkylate product and S-alkylate products containing alkyl 2,6-di(alkyl)aryl sulfide, and cleaving the S-alkylate product in the presence of a sulfide-cleaving catalyst to form additional 2,6-dialkyl thiophenol and starting thiophenol.

14. The process according to claim 13 wherein said olefin consists of propylene.

15. 2-pentyl o-2-pentylphenyl sulfide.
16. Cyclopentyl o-cyclopentylphenyl sulfide.
17. 2-pentyl 2,6-di-2-pentylphenyl sulfide.
18. Cyclopentyl 2,6-dicyclopentylphenyl sulfide.

References Cited in the file of this patent

UNITED STATES PATENTS

| | | |
|---|---|---|
| 2,686,815 | Nickels | Aug. 17, 1954 |
| 2,739,172 | Peters | Mar. 20, 1956 |
| 2,800,451 | Mottern | July 23, 1957 |

UNITED STATES PATENT OFFICE
CERTIFICATE OF CORRECTION

Patent No. 3,076,848                                                  February 5, 1963

Robert J. Laufer

It is hereby certified that error appears in the above numbered patent requiring correction and that the said Letters Patent should read as corrected below.

Column 2, line 31, for "presece" read -- presence --; column 3, line 54, for "atosm" read -- atoms --; column 5, Reaction 1, top of first benzene ring in second row for "SH-CH($CH_3$)$_2$" read -- S-CH($CH_3$)$_2$ --; column 6, Reaction 2, for "Sulfite" read -- Sulfide --; columns 7 and 8, Table I, line 3, for "550 (5 moles)" read -- 550 grams (5 moles)" --; same table line 11, for "thiphenol" read -- thiophenol --; same columns, Table II, line 6, for "26 g." read -- 126 g.--; columns 9 and 10, Table III, Run No. 19, under the heading "catalyst concen., percent by weight thiol" for "17" read -- 18 --.

Signed and sealed this 1st day of October 1963.

(SEAL)
Attest:

ERNEST W. SWIDER                                                    DAVID L. LADD

Attesting Officer                                                        Commissioner of Patents